(12) United States Patent
Levine et al.

(10) Patent No.: US 7,967,507 B2
(45) Date of Patent: Jun. 28, 2011

(54) DIMENSIONAL REFERENCE FOR TOMOGRAPHY

(75) Inventors: Zachary H. Levine, Gaithersburg, MD (US); Steven Grantham, Gaithersburg, MD (US)

(73) Assignee: The United States of America as represented by the Secretary of Commerce, NIST, Washington, DC (US)

( * ) Notice: Subject to any disclaimer, the term of this patent is extended or adjusted under 35 U.S.C. 154(b) by 100 days.

(21) Appl. No.: 12/380,930

(22) Filed: Mar. 5, 2009

(65) Prior Publication Data
US 2009/0213995 A1 Aug. 27, 2009

Related U.S. Application Data

(60) Provisional application No. 61/036,498, filed on Mar. 14, 2008, provisional application No. 61/036,508, filed on Sep. 2, 2008.

(51) Int. Cl.
*G01D 18/00* (2006.01)
(52) U.S. Cl. .................. 378/207; 378/163; 378/205
(58) Field of Classification Search .......... 378/8, 18, 378/20, 56, 163, 204, 205, 207; 600/414, 600/426
See application file for complete search history.

(56) References Cited

U.S. PATENT DOCUMENTS

| | | | |
|---|---|---|---|
| 4,055,771 A * | 10/1977 | Goodenough et al. | 378/18 |
| 6,201,882 B1 * | 3/2001 | Tanaka | 382/106 |
| 6,831,269 B2 * | 12/2004 | Zyromski | 250/252.1 |
| 6,992,280 B2 | 1/2006 | White et al. | |
| 7,147,373 B2 * | 12/2006 | Cho et al. | 378/207 |
| 7,356,120 B2 * | 4/2008 | Main et al. | 378/65 |
| 7,729,472 B2 * | 6/2010 | Scherch et al. | 378/65 |
| 2004/0252811 A1 * | 12/2004 | Morita et al. | 378/207 |
| 2004/0253292 A1 * | 12/2004 | Unal et al. | 424/426 |
| 2005/0047552 A1 * | 3/2005 | Arai et al. | 378/207 |
| 2006/0072124 A1 * | 4/2006 | Smetak et al. | 356/614 |
| 2006/0193781 A1 * | 8/2006 | Frederickson et al. | 424/9.36 |

(Continued)

FOREIGN PATENT DOCUMENTS
WO     WO 2006020792 A2 *    2/2006

OTHER PUBLICATIONS

Park Jo, Lee Si, Song Sy, et al. Measuring Response in Solid Tumors: Comparison of RECIST and WHO Response Criteria. Jpn. J. Clinical Oncology 2003, 33:533-537.

(Continued)

*Primary Examiner* — Anastasia Midkiff
(74) *Attorney, Agent, or Firm* — Daphne L. Burton; Burton IP Law Group

(57) ABSTRACT

A dimensional reference system for tomography, including X-ray computed tomography and MRI tomography. The system includes a dimensional reference apparatus that comprises plurality of spheres composed of a material having an X-ray absorption property between approximately +500 Hounsfield units and +1200 Hounsfield units. The spheres are spaced apart at a known distance by support structure/spacer unit that has an X-ray absorption property between approximately −100 Hounsfield units and +400 Hounsfield units. After an image that incorporates the dimensional reference apparatus and a measurement subject has been reconstructed, the dimensional reference apparatus provides for measurement of the resultant image voxels in three dimensions. Because solid structural elements such as plastic or glass spheres may not be visible in an MRI, an MRI implementation of the apparatus may be disposed in a fluid-tight enclosure along with water, a contrast-enhancing agent and ethanol.

20 Claims, 8 Drawing Sheets

U.S. PATENT DOCUMENTS

| | | | | |
|---|---|---|---|---|
| 2006/0239414 | A1* | 10/2006 | Foulquier et al. | 378/207 |
| 2007/0010702 | A1* | 1/2007 | Wang et al. | 600/8 |
| 2008/0102029 | A1* | 5/2008 | Fritz et al. | 424/1.65 |
| 2008/0269594 | A1* | 10/2008 | Paul et al. | 600/411 |
| 2009/0022668 | A1* | 1/2009 | Aime et al. | 424/9.321 |
| 2009/0104124 | A1* | 4/2009 | Wong et al. | 424/9.32 |

OTHER PUBLICATIONS

Hounsfield GN, Computed Medical Imaging, Medical Physics 1980; 7:283-290.

Berger MJ, Hubbell JH, Seltzer SM, Chang J, Coursey JS, Sukumar R, and Zucker DS. XCOM: Photon Cross Sections Database NIST Standard Reference Database 8, 1998.

http://physics.nist.gov/PhysRefData/Xcom/Text/XCOM.html.

Ferrari M, Ferrari G, and Hempel R. Building Robots with LEGO Mindstorms. Rockland, MA: Syngress, 2002; 3-15.

X. Jiang et al., "Surface Functionalization of Polyethylene for Magnetic Resonance-Signal Enhancing Coating Materials", Chern. Mater. 14, 1914-1920 (2002).

D. Nir et al., "In Vivo Size Error Measurements of Potential Liver Lesions Detected on MRI", Internet J. of Radiology, vol. 2 (1), 2001. ww.phantomlab.com/magphan.html.

N. W. Ashcroft and N. D. Mermin, Solid State Physics, Holt Rinehart, and Winston, New York, 1976, p. 76.

* cited by examiner

DIMENSIONAL REFERENCE FOR TOMOGRAPHY

CROSS-REFERENCE TO RELATED APPLICATIONS

The present application claims priority to provisional application Ser. No. 61/036,498, filed on or about Mar. 14, 2008, entitled "Dimensional Reference for X-Ray Computed Tomography" naming the same inventors as in the present application. The present application further claims priority to provisional application Ser. No. 61/036,508, filed on or about Sep. 2, 2008, entitled "Dimensional Reference for Magnetic Resonance Imaging Tomography," naming the same inventors as in the present application. The contents of these provisional applications are incorporated by reference, the same as if fully set forth.

STATEMENT REGARDING FEDERALLY SPONSORED RESEARCH/DEVELOPMENT

The subject matter of this patent application was invented by employees of the United States Government. Accordingly, the United States Government may manufacture and use the invention for governmental purposes without the payment of any royalties.

BACKGROUND OF THE INVENTION

1. Field of Invention

The present disclosure relates to tomography and, more particularly, to a dimensional reference for use in tomography that is capable of providing length scales in three dimensions.

2. Description of Related Art

Tomography may be used to obtain images of human tissue by section. The image may be obtained through modalities such as X-ray computed tomography or magnetic resonance imaging (MRI) tomography. The modality for X-ray computed tomography (X-ray CT) includes medical computed tomography (medical CT) as well as micro computed tomography (micro-CT). Micro-CT is a term that may be used to describe CT systems having a resolution on the order of one micrometer to one hundred micrometers. Nodules and lesions are examples of human tissue that may be imaged using tomography. Because such nodules and lesions may be cancerous, it may be desirable for medical personnel to monitor any such nodule or lesion in order to determine an appropriate treatment protocol. One indicator that may point to cancer is a change in the size of the nodule or lesion.

Changes in the size of a nodule or lesion may be difficult to determine due to different measurement protocols. Accordingly, physicians may need to determine whether an apparent change in nodule or lesion size that is seen on a subsequent patient visit is an actual change, or whether the apparent change in size is due to a measurement error.

Measurement errors that result in apparent changes in nodule or lesion sizes may be caused by a number of factors. For example, where a patient has one hospital perform a first measurement, and then a second hospital perform a subsequent measurement, measurement differences may occur simply because different measurement protocols are used. Moreover, operators for imaging instruments may have different measurement protocols. In addition, factors such as different scan protocols, changes in hardware and software used in the measurement process, as well as changes in imaging instruments may cause an apparent change in nodule or lesion size.

Measurement errors may have a grave effect in that an apparent change, e.g., an increase, in nodule or lesion size may lead to a false positive diagnosis. On the other hand, where the true size of the nodule or lesion is masked, a false negative diagnosis may result.

Various fiducial reference apparatuses have been deployed to monitor a nodule's size. These fiducial reference apparatuses are sometimes known as phantoms. However, these apparatuses may be very expensive, often costing thousands of dollars.

There is a need for dimensional reference apparatus that can significantly reduce measurement errors, and that has a reasonable cost.

BRIEF SUMMARY OF DISCLOSURE

The present disclosure addresses the foregoing deficiencies of the prior art by providing a dimensional reference for tomography. In accordance with one embodiment of the present disclosure, a dimensional reference system for image reconstruction in tomography is provided. The system comprises a dimensional reference apparatus having a plurality of spheres, each sphere having an X-ray absorption property configured to permit reconstruction of the sphere in tomography, each sphere further having a centroid and a diameter. The dimensional reference apparatus further has a spacer unit configured to substantially fixedly space apart each of said plurality of spheres from each other at a known distance. When reconstructed in tomography, the dimensional reference apparatus is configured to provide subvoxel length scales for three dimensions, wherein said length scales are provided based on either the known distances between the centroids of the plurality of spheres, or the diameter of at least one of the plurality of spheres.

In accordance with another embodiment of the present disclosure, a dimensional reference system for image reconstruction in X-ray computerized tomography is provided. The system comprises a dimensional reference apparatus having three substantially identical spheres, each sphere being composed of a sphere material having an X-ray absorption property between approximately +500 Hounsfield units and +1200 Hounsfield units, each sphere further having a centroid and a diameter. The dimensional reference apparatus further has a spacer unit configured to substantially fixedly space apart each of said plurality of spheres from each other at a known distance, the spacer unit being composed of a spacer unit material having an X-ray absorption between approximately −100 Hounsfield units and +400 Hounsfield units. The spacer unit comprises two fixtures, each fixture having three circular holes into which the three substantially identical spheres are configured to be disposed. When reconstructed in tomography, the dimensional reference apparatus is configured to provide subvoxel length scales for three dimensions, wherein said length scales are provided based on either the known distances between the centroids of the plurality of spheres, or the diameter of at least one of the plurality of spheres.

In accordance with yet another embodiment of the present disclosure, a negative space dimensional reference system for use in MRI tomography is provided. The system comprises a fluid-tight enclosure. The system further comprises a dimensional reference apparatus having a plurality of substantially identical spheres, each sphere having an X-ray absorption property configured to permit reconstruction of the sphere in tomography, each sphere further having a centroid and a diameter. The apparatus further has a spacer unit configured to substantially fixedly space apart each of said plurality of spheres from each other at a known distance. When reconstructed in tomography, the dimensional reference apparatus is configured to provide subvoxel length scales for three dimensions, wherein said length scales are provided based on either the known distances between the centroids of the plurality of spheres, or the diameter of at least one of the plurality of spheres.

The negative space dimensional reference system further includes a mixture configured to provide contrast between the mixture and the dimensional reference apparatus. The mixture and dimensional reference apparatus are configured to substantially fill the interior of the enclosure.

In accordance with still yet another embodiment of the present disclosure, a negative space dimensional reference array system for use in MRI tomography is provided. The system comprises a fluid-tight enclosure, and a plurality of substantially identical spheres, each sphere being arranged in substantially a hexagonal close packed array, each sphere further having a centroid and a diameter. When reconstructed in tomography, the plurality of spheres are configured to provide subvoxel length scales for three dimensions, wherein said length scales are provided based on either the known distances between the centroids of the plurality of spheres, or the diameter of at least one of the plurality of spheres. The negative space dimensional reference array system further comprises a mixture configured to provide contrast between the mixture and the plurality of spheres. The mixture and the plurality of spheres are configured to substantially fill the interior of the enclosure.

These, as well as other objects, features and benefits will now become clear from a review of the following detailed description of illustrative embodiments and the accompanying drawings.

DETAILED DESCRIPTION OF THE DISCLOSURE

The dimensional reference apparatus of the present disclosure may be used in conjunction with X-ray computed tomography (CT) or magnetic resonance imaging (MRI) tomography. X-ray CT is a modality that is often used to detect cancerous nodules or lesions.

In accordance with a protocol sometimes employed with the CT modality, a patient may be given a CT scan (also known as a "CAT scan") and then re-scanned on a subsequent date, e.g., six (6) months. After the patient has been re-scanned, a physician such as a radiologist may review the resulting computer-generated images in order to determine whether a given nodule has grown, particularly since malignant nodules or lesions have been known to grow exponentially. In accordance with a common protocol known as RECIST (Response Evaluation Criteria in Solid Tumors), the longest single dimension of the nodule at issue may be recorded. In addition, two-dimensional protocols as well as three-dimensional volumetric protocols may also be used.

The dimensional reference apparatus includes a plurality of spheres that are substantially fixedly spaced apart by a spacer structure that also operates to support the spheres. The materials used for the dimensional reference apparatus have X-ray absorption properties in the range of human tissue so that the apparatus can be seen on the reconstructed, computer-generated image.

Figure 1A:
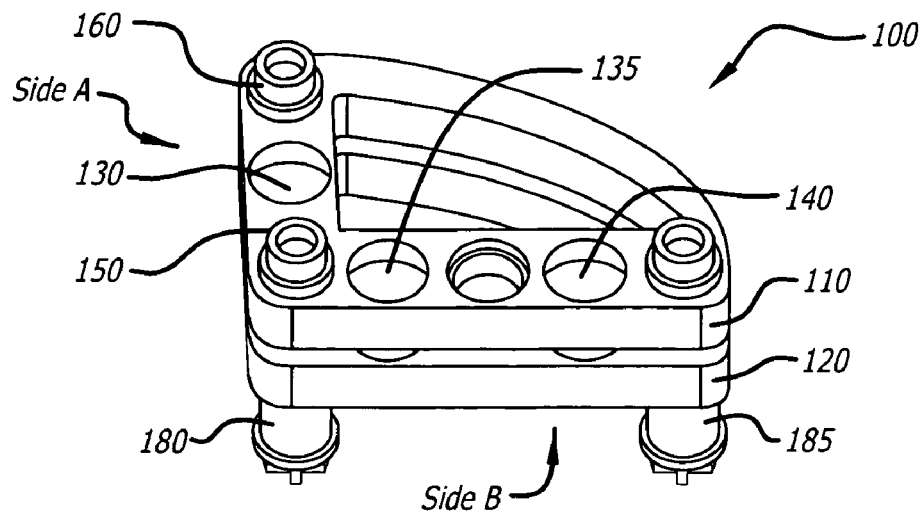
FIG. 1A is a perspective view of a dimensional reference apparatus in accordance with one embodiment of the present disclosure.

Referring now to FIG. 1A, illustrated is perspective view of a dimensional reference apparatus in accordance with one embodiment of the present disclosure. The apparatus 100 includes a spacer unit composed of upper fixture 110 and lower fixture 120, each fixture being attached to the other via cross axles 150, 160, 170, which are also a part of the spacer unit. The cross axles 150, 160, 170 are secured to the fixtures 110, 120 via bushings 180, 185, and a third bushing not visible in the figure. It should be noted that fixtures 110, 120 are interchangeable.

Figure 1B:
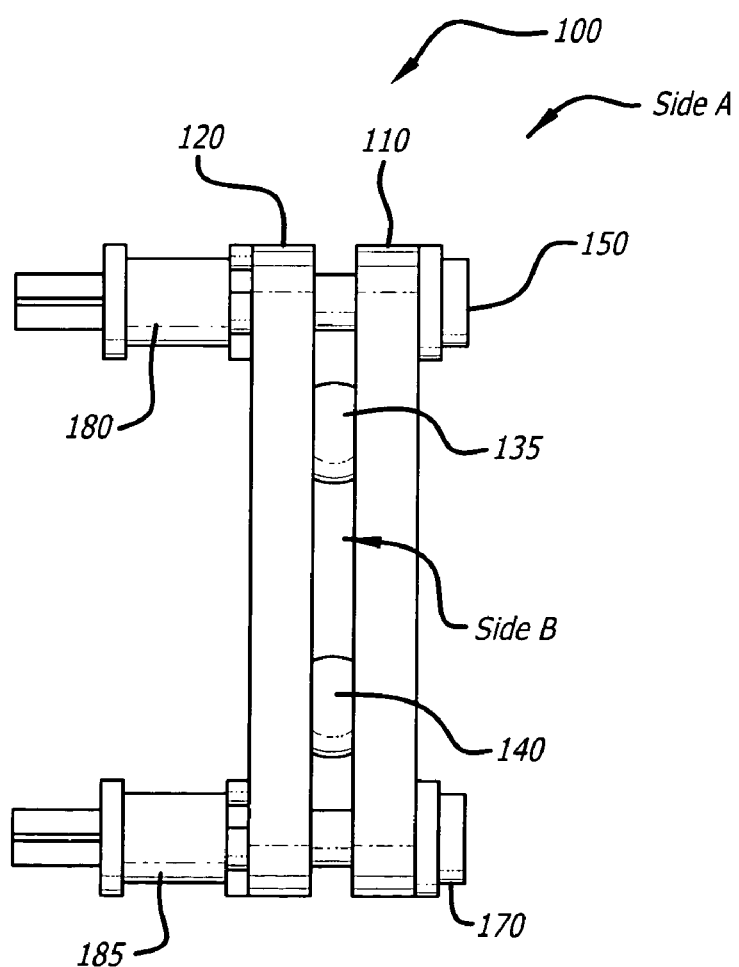
FIG. 1B is a side view of a dimensional reference apparatus in accordance with one embodiment of the present disclosure.

Two additional views of this embodiment of the dimensional reference apparatus are also provided in order to better illustrate additional components of the apparatus. Referring now to FIG. 1B, illustrated is a side view of a dimensional reference apparatus in accordance with one embodiment of the present disclosure. As illustrated in FIG. 1B, bushing 180 secures cross axle 150 at one end.

Figure 1C:
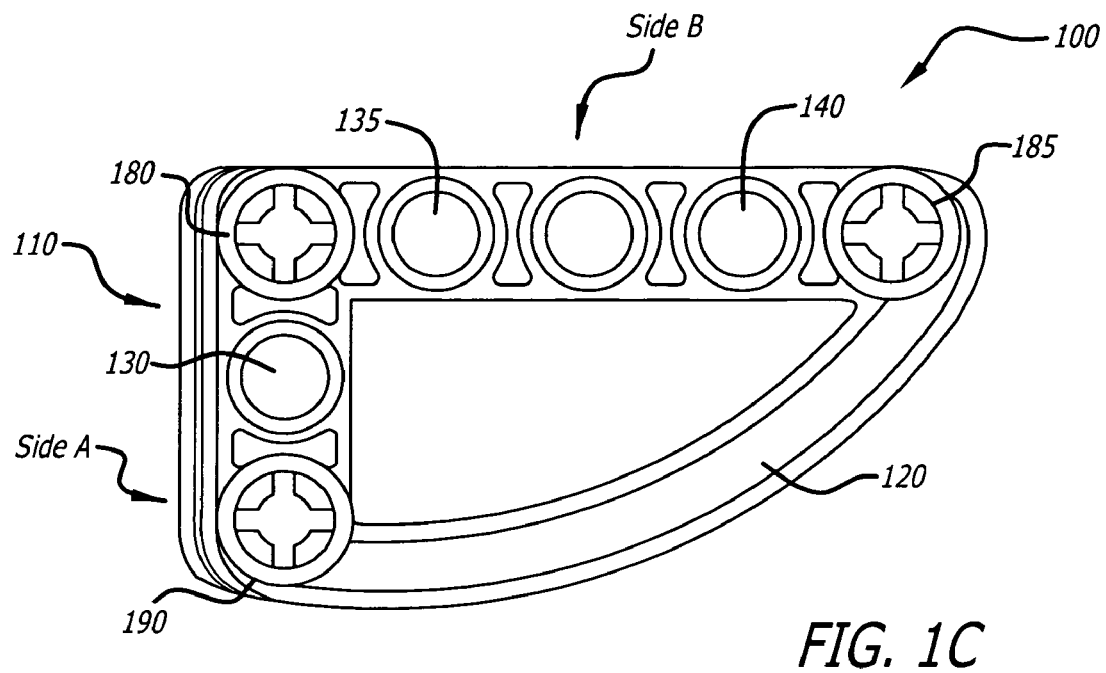
FIG. 1C is a bottom view of a dimensional reference apparatus in accordance with one embodiment of the present disclosure.

Referring now to FIG. 1C, illustrated is a bottom view of the dimensional reference apparatus in accordance with one embodiment of the present disclosure. Here, each of the bushings 180, 185, 190 is shown in greater detail. It should be noted that bushings 180, 185, 190 also make up a portion of the spacer unit.

Fixtures 110, 120, cross axles 150, 160, 170 and bushings 180, 185, 190 may be composed of any number of suitable components, including but not limited to LEGO® TECHNIC® construction parts including 3×5 liftarms as fixtures, as well as available cross axle and bushing construction parts.

The three (3) substantially identical spheres 130, 135, 140 may be disposed within the fixtures 110, 120 so that the spheres fit snugly and the centroids may be easily ascertained. Spheres 130, 135, 140 may be composed of polytetrafluoroethylene (PTFE or TEFLON®) material. PTFE may be used for good reconstruction contrast against the support structure. In lieu of PTFE, spherical BK7 glass lenses may be used as spheres 130, 135, 140. The material known as BK7 glass is commonly used in optical components because of its good physical and chemical properties, particularly in the visible and near infrared range. This borosilicate crown optical glass has high homogeneity, as well as low inclusion and bubble content.

Figure 1D:
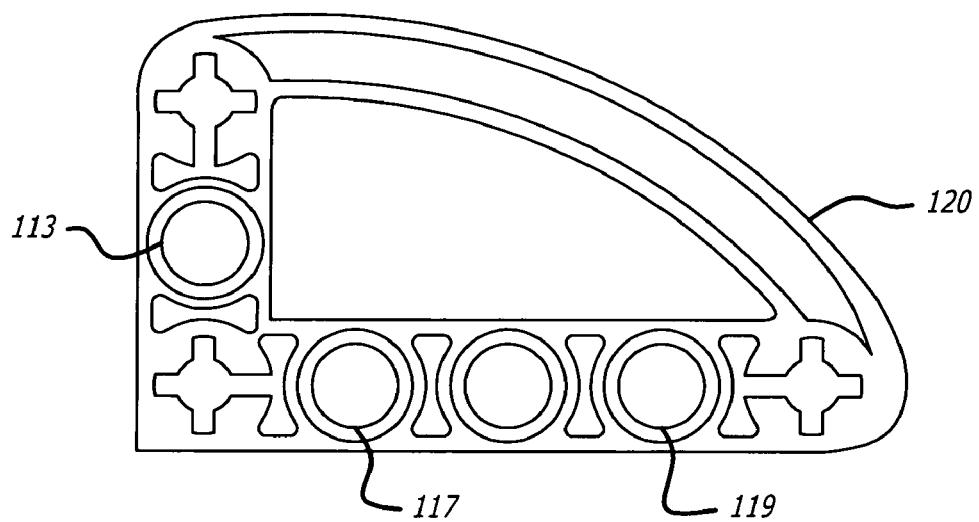
FIG. 1D shows a fixture for a dimensional reference apparatus in accordance with one embodiment of the present disclosure.

Referring now to FIG. 1D, illustrated is a solitary fixture 120 in accordance with one embodiment of the present disclosure. Fixture 120 may incorporate circular holes 113, 117, 119 having diameters somewhat smaller than the spheres that are to rest within the circular holes.

Figure 1E:
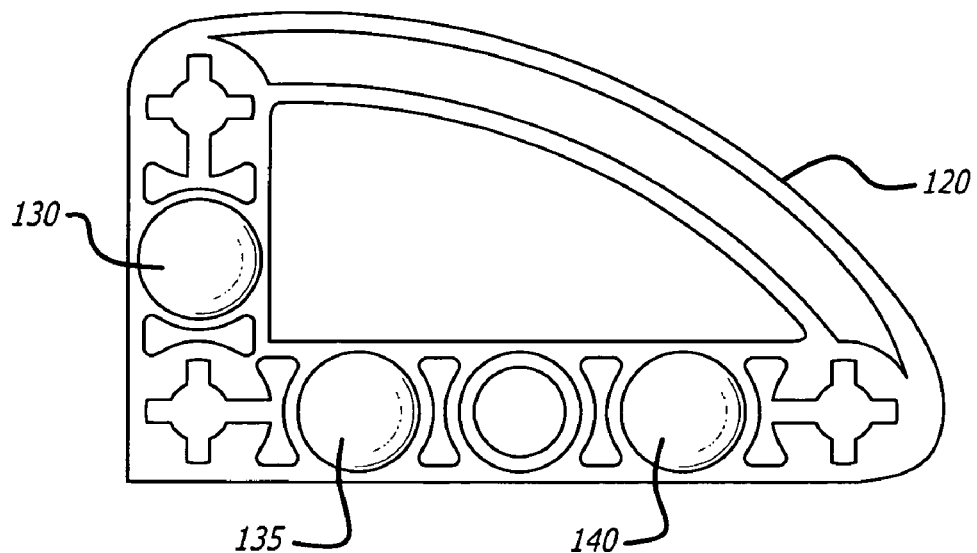
FIG. 1E shows a fixture having spheres spaced apart within the fixture in accordance with one embodiment of the present disclosure.

Referring now to FIG. 1E, illustrated is a lower fixture 120 having spheres 130, 135, 140 disposed within its circular holes. Spheres 130, 135, 140 may rest, or be disposed, on the inner step of the circular holes of fixture 120. When an upper fixture is connected to lower fixture 120 via cross axles, these fixtures may supply symmetric support to each of spheres 130, 135, 140. In this case, any deformations induced by the support structure may lead to a symmetrical distortion of one or more of spheres 130, 135, 140, without moving the centroids of spheres 130, 135, 140.

Spheres 130, 135, 140 may have diameters of 5.5 mm to 6.5 mm where the inner diameter of the circular hole of each of fixtures 110, 120 is 4.86 mm and the outer diameter is 6.14 mm. Moreover, the thickness of fixtures 110, 120 may be 3.88 mm and the step height may be 0.81 mm.

Each of spheres 130, 135, 140 may have a nominal diameter of 6.35 mm (0.250 in) and may be designated as Grade 1, thus having a diameter and sphericity tolerance of ±0.025 mm (±0.001 in). As used herein, sphericity is defined as the greatest radial distance in any plane between a sphere circumscribed around the sphere and any point on the sphere.

In determining the material for the spheres, the X-ray absorption properties of such sphere material is of particular interest since the spheres are to be eventually used as a dimensional reference on an X-ray tomogram. In choosing the material for the spheres, any practical reconstruction algorithm (e.g., filtered backprojection) may allow for the reconstruction of materials with an absorption coefficient from air to bone.

The Hounsfield scale may be used to quantify the radiodensity of a material. Using the scale of Hounsfield Units (HU), by definition, the radiodensity of air is −1000 HU, while the radiodensity of water is 0 HU. Typically, the radiodensity of bone is +1000 HU. In CT, the Hounsfield Unit is dependent upon the parameters of the CT scanner. For example, the value of the high voltage and the target material may jointly determine the X-ray spectrum.

A drawback to use of the Hounsfield scale is that a significant number of CT scanners incorporate use of the metric system, while the HU scale does not appear in the Système Internationale (SI). Despite this fact, it may be important to quantify in HU because of their common use by various groups. For example, the U.S. radiological community expresses radiodensity quantities in terms of HUs. Medical CT may also report values in HUs.

Hounsfield Units are not readily convertible to SI (i.e., metric units), but for estimation purposes, the spectrum may be approximated using a 70 keV monochromatic X-ray beam. When such a 70 keV beam is directed to a particular material, it may drop an electron through high voltage, e.g., 120 kV, and eventually land on the target material. When the electron decelerates, it emits X-rays. Using reference data, such as that found in the XCOM Photon Cross Sections Database, it is possible to estimate the absorption of various materials. The results of absorption are shown in table 1 immediately hereafter.

TABLE 1

| Material | Attenuation coeff. ($cm^2/g$) | Density $g/cm^3$ | Attenuation length (cm) | Est. HU | Exp. HU |
|---|---|---|---|---|---|
| Water | 0.193 | 1.00 | 5.18 | 0 (by def.) | — |
| ABS | 0.180 | 1.05 | 5.29 | −20 | +18 |
| PTFE | 0.173 | 2.2 | 2.63 | 970 | +905 |
| Fused silica | 0.195 | 2.2 | 2.33 | 1331 | +2684 |

As previously discussed, the value of the high voltage and the target material may jointly determine the X-ray spectrum. Illustrated in table 1 above are the attenuation coefficients for 70 keV X-rays and absorption estimates in HU. ABS (acrylonitrile butadiene styrene copolymer), is shown because it is reported to be the principle material in LEGO® TECHNIC® construction parts. The attenuation coefficient of PTFE is shown since it constitutes sphere material. The attenuation coefficient of fused silica is shown because it is used for BK7 glass spheres. Although BK7 glass spheres do not have an attenuation coefficient that falls between air and bone, this material is commonly used in CT reconstructions and therefore is likely produce satisfactory results. The attenuation coefficient of air is neglected in the estimate of the Hounsfield Units. An attenuation coefficient ($t_0$) may be defined as a function of the intensity of a beam passing through a material of thickness t as follows:

$$I(t) = I_0 e^{-t/t_0} \quad \text{(Equation 1)}$$

where $I_0$ is the intensity incident on the entrance surface of the material. The experiment is a maximum value taken as reported by the medical CT.

If BK7 glass lenses are used as material for spheres 130, 135, 140 instead of PTFE, 6.0 mm diameter lenses may be used. Such material may be considerably more expensive. Despite their expense, BK7 glass lenses may permit the determination of the sphere locations more precisely during reconstruction.

The fixtures may be composed of acrylonitrile butadiene styrene (ABS). Referring back to Table 1, ABS has a measured peak absorption of +18 HU. Thus, because the PTFE balls have a measured peak absorption of +905 HU, their measured peak absorption is well separated from the ABS fixtures. If BK7 glass lenses are used instead of the PTFE balls, their measured peak absorption of +2684 HU is also well separated from that of the ABS fixtures.

Figure 2:
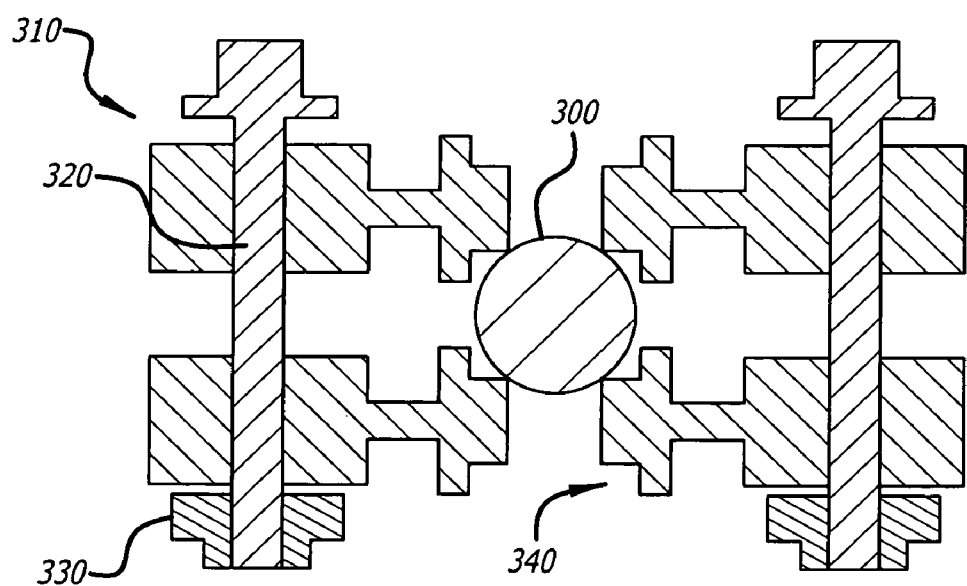
FIG. 2 illustrates a slice from a micro-CT reconstruction of the dimensional reference apparatus shown in FIGS. 1A-1C in accordance with one embodiment of the present disclosure.

Separation between the X-ray absorption property of the spheres and the supporting structure is apparent in reconstructed tomographical images. Referring now to FIG. 2, illustrated is a slice from a micro-CT reconstruction of a portion of the dimensional reference apparatus shown in FIGS. 1A-1C. As shown, the sphere 300 can be easily distinguished from the cross axle 320, bushing 330 and fixture 340 of spacer unit 310. The sphere 300 is much darker than the spacer unit elements due to its higher X-ray absorption property.

Referring back to FIG. 1A, the present embodiment incorporates a quantity of three (3) spheres. The World Health Organization (WHO) has a measurement protocol that incorporates two-dimensional metrics to determine a change in nodule or lesion size. For two-dimensional metrics, three (3) spheres (such as those shown in FIG. 1A) may be used.

In accordance with the examples described herein, many medical CT and micro CT applications may require the use of three (3) spheres since these types of CT reconstructions are often performed from a two-dimensional image.

A suitable spacing distance for the spheres may be determined based on the protocol used as well as other factors. In some cases, whether a certain centroid-to-centroid distance is suitable may be dependent upon the anticipated size of the nodules or lesions to be measured. For example, it may be desirable to space the spheres at a greater distance for larger nodules or lesions (e.g., those measuring tens of millimeters) than for smaller nodules or lesions (e.g., those measuring 3-10 mm).

Because the fixtures used as examples herein are prefabricated structures based on a Cartesian grid, ideal spacing between the centroids of spheres 130, 135 and 140 may be calculated using the Pythagorean Theorem.

Figure 3:
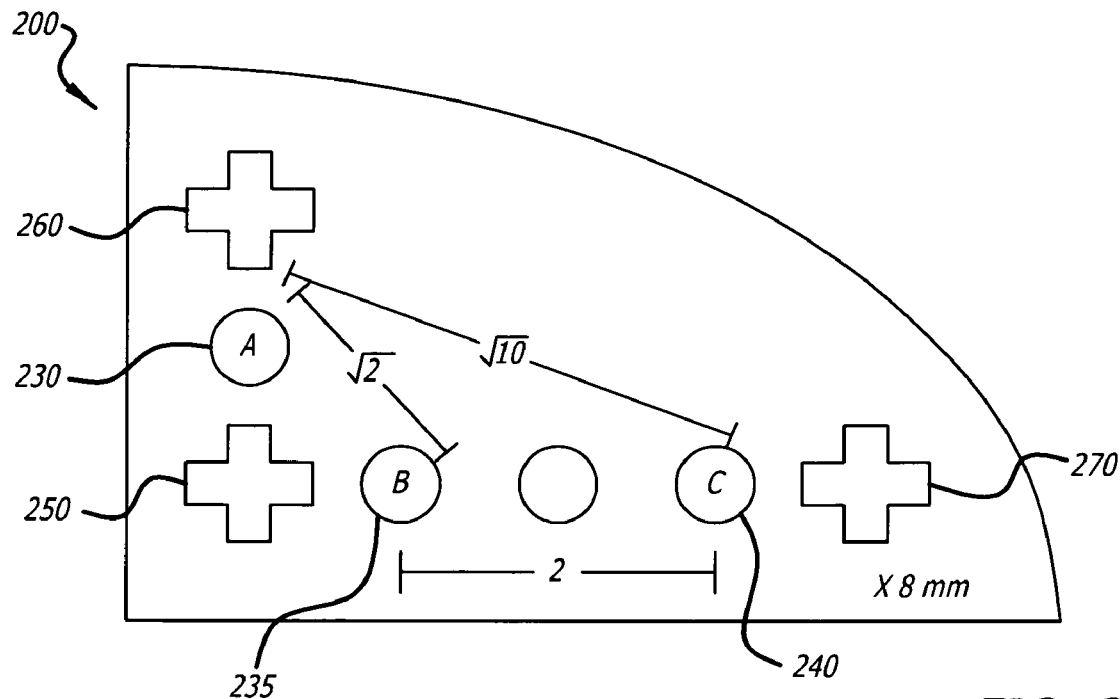
FIG. 3 is a schematic showing dimensions of the dimensional reference apparatus in accordance with one embodiment of the present disclosure.

Referring now to FIG. 3, this schematic shows dimensions of the fixture used in a dimensional reference apparatus in accordance with one embodiment of the present disclosure. As shown, fixture 200 may define an orthogonal grid with a spacing of 8 mm. Where we define the origin as being located at the center of cross axle 250, the spheres 230, 235, 240 may be assumed to be at grid positions (0, 1), (1, 0) and (3, 0) respectively. Using the Pythagorean Theorem, spacing between the centroids of the spheres may be at $\sqrt{2}$, 2 and $\sqrt{10}$ times 8 mm, or 11.314 mm, 16.000 mm and 25.298 mm, respectively. Cross axles 260, 270 are shown at the corners of fixture 200.

In use, the dimensional reference apparatus of the present disclosure may be placed next to or on the measurement subject—typically, but not necessarily, a human patient—during a CT scan. Accordingly, the dimensions of the dimensional reference apparatus are transferred to the reconstructed tomogram. Thus, the dimensional reference may be viewed on a computer screen as part of the reconstructed tomogram.

Figure 4:
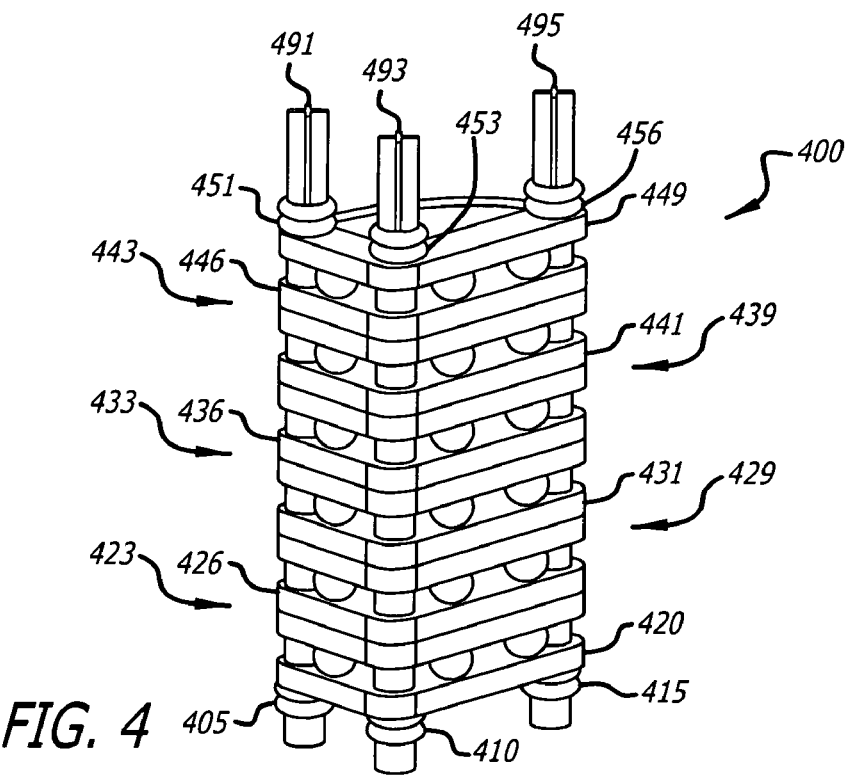
FIG. 4 illustrates a multiple-layered embodiment of a dimensional reference apparatus for use in measuring three dimensions in accordance with one embodiment of the present disclosure.

The embodiments up to this point have incorporated three (3) spheres. For a number of protocols, three (3) spheres may be used to obtain a two-dimensional image and the image is later rendered in three dimensions. However, it should be noted that three-dimensional volumetric protocols are newly emerging and may require the use of more than three (3) spheres spaced a suitable distance apart. As a general principle, the number of spheres needed for a particular protocol is at least one more than the number of dimensions required by that protocol.

Where a protocol calls for measurements in three dimensions, without the use of three-dimensional image rendering, a stacked embodiment of the dimensional reference apparatus may be used. Referring now to FIG. 4, illustrated is a stacked embodiment of a dimensional reference apparatus for use in measuring three dimensions in accordance with one embodiment of the present disclosure. Essentially, this embodiment is a multiple-layered version of the embodiment in FIG. 1A having multiple fixtures disposed between each layer of spheres.

As shown in the stacked dimensional reference apparatus 400 of FIG. 4, at the bottom of the apparatus 400 are three bushings 405, 410, 415. The apparatus 400 includes three (3) spheres at each of six (6) layers. The spacer unit in this embodiment includes twelve (12) fixtures. The twelve (12) fixtures are generally layered in groups of two, but also having a single fixture at each end. More particularly, fixtures 449, 420 are single fixtures disposed at the top and bottom, respectively of the stacked embodiment. Fixtures 423, 426 constitute a double-stacked fixture, with fixture 426 being disposed directly on top of fixture 423. Likewise, fixture 431 is stacked directly on top of fixture 429; fixture 436 is directly on top of fixture 433; fixture 441 is stacked directly on top of fixture 439; fixture 446 is directly on top of fixture 443. Each of the fixtures in this embodiment are interchangeable with each other.

Securing elements for the twelve (12) fixtures that are referenced immediately above include half bushings 405, 410 and 415, which are disposed at the bottom portion of the spacer unit. Half bushings 451, 453, 456 are disposed at the top portion of the spacer unit for apparatus 400. Each of the bushings that are disposed at the top and bottom of the spacer unit secure cross axles 491, 493, 495 which, in turn, connect the layers of the apparatus 400 to each other. If a LEGO® TECHNIC® implementation is made, the cross axles may be longer than in a single layer embodiment. For example, the cross axles may be 96 mm long.

While the present embodiment is described in terms of the measurement subject as a human patient, it should be understood that the dimensional reference apparatus could be used in connection with other measurement subjects. For example, the measurement subjects may include, but are not limited to, mammals such as horses, dogs, cats, and rodents (including laboratory mice and rats).

In addition, it should be noted that the dimensional reference apparatus of the present disclosure may be used to measure practically any body portion in tomographical images, including but not limited to, the thoracic region (such as the lungs and chest), the pelvic region, the cervical region, the lumbar region, the sacral region, organs such as the liver, the brain, adrenal glands, or any other region of the body where a measurement needs to be taken in tomography.

The dimensional reference apparatus may be used not only to measure the size of potentially cancerous nodules and lesions, but it may also be used in a broad variety of other applications. For example, a medical professional may use the dimensional reference apparatus to measure and track thickening of the sinuses to determine how far sinusitis has advanced. A medical professional may use the apparatus to measure the extent of a bone's breakage, including the relatively small bones in the sinus and nasal regions. A medical professional may also use the apparatus to measure the accumulation of fluid, e.g., in a patient's chest infection. A cosmetic surgeon may use the apparatus to measure the amount of fat in a patient in preparation for liposuction. In short, there are a number of potential uses for this dimensional reference apparatus in tomography.

The dimensional reference apparatus may be used to measure inanimate objects that have X-ray absorption properties that permit reconstruction. For example, plastic parts and other objects composed primarily of polymers (including polymer foams) may be measured using this apparatus.

In order to confirm the accuracy of the measurements during reconstruction, physical measurements may be taken and compared to measurements obtained from reconstructed images. For example, a CORDAX RS-5® coordinate measuring machine (CMM) such as that found at the National Institute of Standards and Technology may be used to measure physical distances between the spheres. This particular CMM uses contact probe technology. A microCT reconstruction may be obtained with a pixel size of 0.028 mm, which is far below a typical medical CT pixel (about 0.5 mm). X-ray micro-CT is based on the same principles as medical CT, but provides higher resolution images compared to the medical CT. Accordingly, in order to confirm that the dimensional reference works with medical CT as well, a medical CT reconstruction may be obtained using a CT scanner such as a GE® LIGHTSPEED® scanner.

The sphere diameters may also be measured using the CMM, with 15 points distributed over the exposed portion of the sample. A least squares fit may be used to find the best fitting curve in order to determine sphere diameter, given the set of 15 measured points.

The centroids of the spheres may be obtained through post-reconstruction thresholding. Thresholding is known in the art and may be performed automatically using algorithms, or it may be performed manually. The CT reconstruction generally displays a gray scale object. When thresholding is performed manually, the operator or physician may select a gray scale value of the pixels at which the spheres and support structure can be visually distinguished—and are separated—from each other as well as the background. Using thresholding, pixels integrated into the image are those having radiodensities that are above a certain threshold. In both the medical CT and micro CT cases, the PTFE balls have an X-ray absorption that is well separated from that of the support structure.

In a first step toward manually choosing the location of each sphere's centroid, such locations may be estimated manually from a representative reconstructed slice. This manual selection may be made using a computer mouse. A spherical mask with, e.g., 150%, of the nominal radius may be chosen. The nominal radius may be obtained using the manufacturer's specifications. The value of 150% may be an estimated starting point because it is sufficiently large to ensure that the entire sphere is included after the center was selected by hand. On the other hand, the value of 150% is small enough so that no other sphere is included. The image, including the dimensional reference apparatus, may be taken to include all voxels above the threshold (below in the case of the microCT). The centroid of these voxels may be determined.

Figure 5:
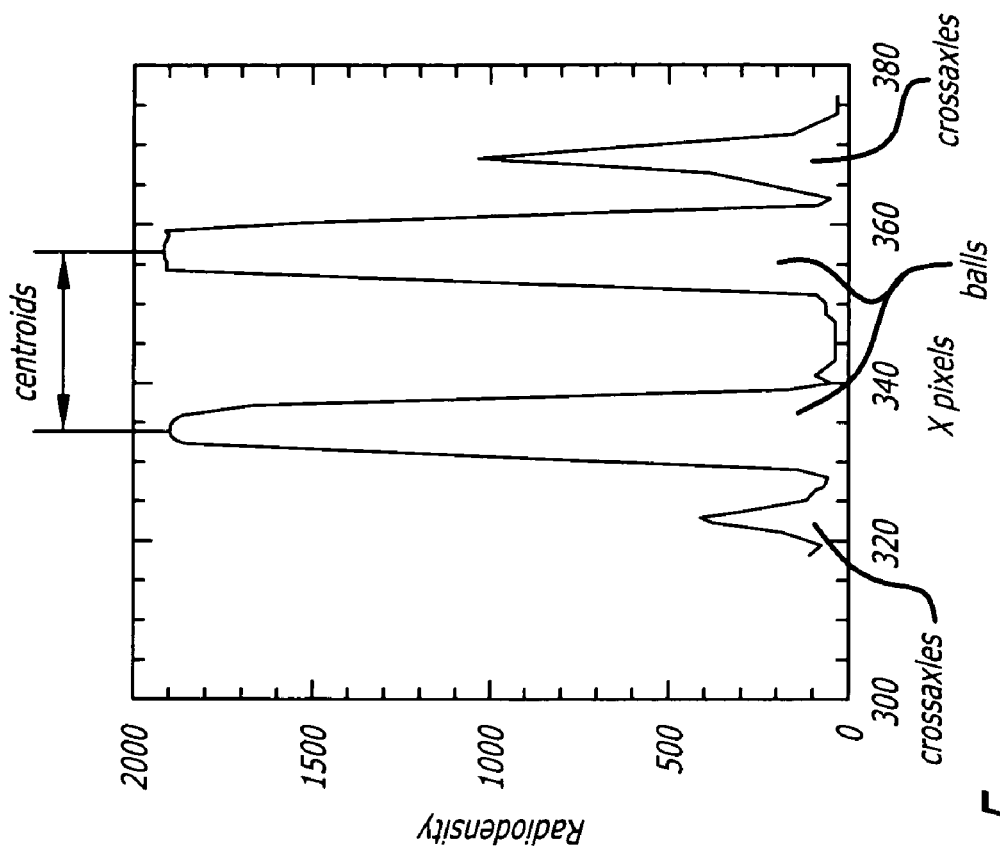
FIG. 5 illustrates a screen from a CT reconstruction that incorporates the dimensional reference apparatus in accordance with one embodiment of the present disclosure.
Figure 5:
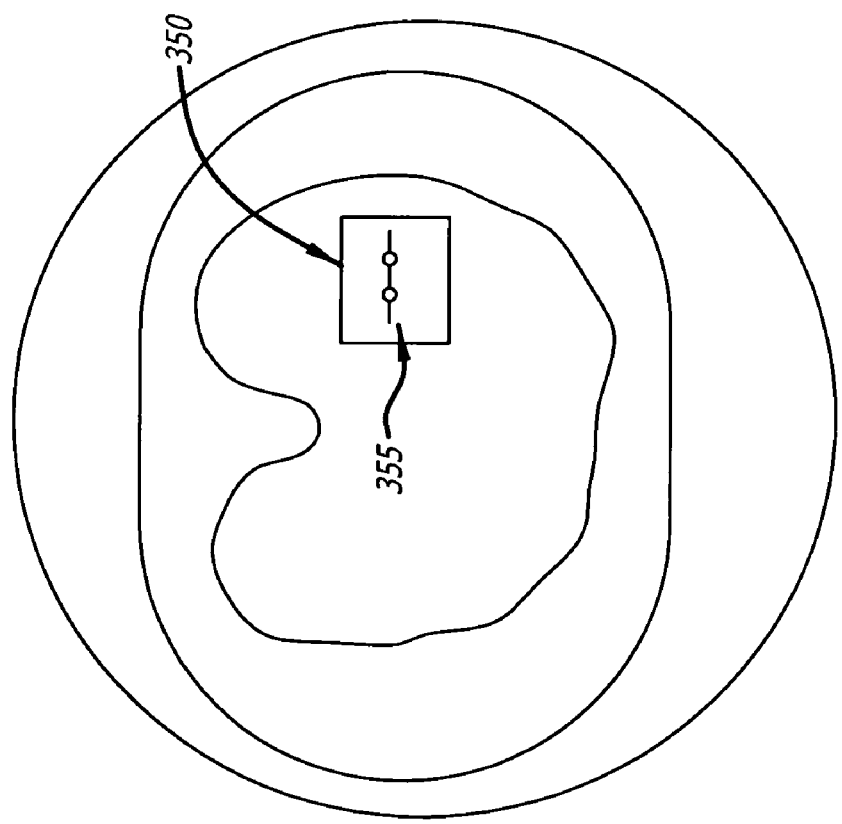

Using the dimensional reference apparatus of the present disclosure, centroid-to-centroid measurements may be used as a reference for dimensions in tomography. Referring now to FIG. 5, illustrated is a screen from a CT reconstruction that incorporates the dimensional reference apparatus in accordance with one embodiment of the present disclosure.

As shown on the left portion of the screen, slice 013 of the CT scan is being reviewed. At the left portion of FIG. 5, in box 350, is a horizontal line 355. The graph shown at the right portion illustrates why it may be more difficult to find the edges of the spheres (for purposes of using sphere diameters as a dimensional reference) rather than distances between the spheres' centroids. However, it should be understood that—in lieu of using centroid-to-centroid measurements as dimensional references—sphere diameters may be used as a reference for dimensions in reconstruction.

The sphere diameters may be determined from the second moment tensor about the centroid of each sphere. This may be accomplished using the same spherical mask. For each voxel above the previously determined threshold, a discrete sum may be made of the product of two—albeit not necessarily distinct—coordinate differences from the voxel center to the centroid determined above.

The three measurements and the ideal values are illustrated in Table 2.

TABLE 2

|   | |AB| | |BC| | |CA| |
|---|---|---|---|
| Ideal | 11.314 | 16.000 | 25.298 |
| Physical --PTFE | +0.013 ± 0.085 | −0.039 ± 0.085 | −0.039 ± 0.085 |
| MicroCT --PTFE | +0.032 | +0.032 | +0.050 |
| Medical CT-- PTFE | +0.093 | +0.036 | +0.014 |
| Physical -- Glass | +0.032 ± 0.055 | −0.015 ± 0.055 | +0.007 ± 0.055 |
| Medical CT-- Glass | +0.025 | +0.012 | +0.061 |

Table 2 shows distances between centroids in the dimensional reference apparatus in units of millimeters (mm). In Table 2, points A, B, and C refer to the centroids of the spheres 130, 135 and 140 of FIG. 1A.

In column 1 of Table 2, the first row lists the ideal measurements for distances between the centroids. In each additional row of Table 2, Column 1, the methods and materials used for the spheres are given in each case. Two of the elements in Column 1, refer to a "physical" method. It should be noted that the term "physical" is used to refer to measurements performed on a coordinate measuring machine.

Also with respect to two elements of column 1, the term "Medical CT" refers to data acquired by a GE® LIGHTSPEED®. With respect to another element listed in column 1, the term "MicroCT" refers to data acquired by a SKYSCAN 1172® by Micro Photonics, Inc. with 0.028 mm pixels, and analyzed at NIST.

Listed underneath the ideal measurements are deviations from the ideal values. For example, for a physical measurement using PTFE spheres, the distance from the centroid of sphere A to the centroid of sphere B, is 0.013 mm higher than the ideal measurement of 11.314.

An uncertainty of ±0.085 mm is associated with the measurement of the distance from the centroid of sphere A to the centroid of sphere B. This measure of uncertainty defines an interval about the measurement result 0.013 mm within which the value of the measure may be reasonably confidently asserted to lie. This measure of uncertainty is known as expanded uncertainty, and may be obtained through use of a coverage factor, denoted by the symbol k.

The value of the coverage factor k may be chosen on the basis of the desired level of confidence to be associated with the defined interval. Typically, k is in the range 2 to 3. Where k=2, it defines an interval having a level of confidence of approximately 95%, and where k=3, it defines an interval having a level of confidence greater than 99%. Uncertainties for the physical measurement of the dimensional reference apparatus herein have a coverage factor k=2, which corresponds to a 95% level of confidence.

The results in Table 2 represent subvoxel accuracy for medical CT. The medical CT scans were taken with a voxel size of 0.703 mm×0.703 mm×1.250 mm. Because medical CT voxel sizes are rarely less than 0.3 mm×0.3 mm×0.625 mm, the increase in apparent resolution may be helpful when studying nodules or lesions having smaller sizes.

As illustrated in Table 2, the dimensional reference apparatus of the present disclosure was shown to have no dimension out of the ideal by as much as 0.1 mm. The data are drawn from a single scan for both medical CT and microCT.

In constructing the dimensional reference apparatus, it may be desirable to manually confirm the sizes of the individual spheres used. In this manner, accuracy of measurement techniques that incorporate the dimensional reference apparatus may be enhanced. The sphere diameters were measured with the CMM were 6.008 mm, 6.018 mm, and 6.048 mm, with a 95% level of confidence uncertainty of ±0.060 mm for the three glass spheres, compared to a manufacturer's specification of 6.0 mm. For the three PTFE spheres, the results were 6.368 mm, 6.367 mm, and 6.401 mm, with an uncertainty of ±0.095 mm, compared to a manufacturer's specification of 6.350 mm ±0.025 mm (quoted as 0.250 inches ±0.001 inch). Therefore, all parameters measured were consistent with their specified or expected values given the uncertainties of measurement and the specified tolerances.

For certain purposes, it may be desirable to provide a dimensional reference based on the diameters of the spheres (or sphere volume) as opposed to centroid-to-centroid measurements. The diameters of the reference spheres are known. The apparent diameters of the spheres as shown in reconstruction may depend upon the chosen threshold. It may be possible to determine an appropriate threshold value that results in the known diameter or volume. Moreover, if the sphere material has X-ray absorption properties that are similar to that of the measurement subject, the threshold that gives the correct diameter or volume may also be used for unidentified objects (e.g., nodules or lesions) in the CT reconstruction.

The sphere diameters may be determined from the second moment tensor of the spheres. Theoretically, the second moment of a sphere of radius R is given by $$\langle r^2 \rangle = \frac{4\pi \int_0^R dr\, r^2 r^2}{4\pi \int_0^R dr\, r^2} \qquad \text{(Equation 2)}$$

$$= \frac{3}{5} R^2$$

The radius R may also be expressed according to the following equation by symmetry:

$$\langle x^2 \rangle = \langle y^2 \rangle = \langle z^2 \rangle = R^2/5. \qquad \text{(Equation 3)}$$

since the following is true:

$$\langle r^2 \rangle = \langle x^2 \rangle + \langle y^2 \rangle + \langle z^2 \rangle \qquad \text{(Equation 4)}$$

Also due to symmetry, the off-diagonal elements of the second moment tensor disappear as shown by the following equation:

$$\langle xy \rangle = \langle yz \rangle = \langle zx \rangle = 0 \qquad \text{(Equation 5)}$$

In Table 3 below, the components of the second moment tensor are given in units of mm² for the three PTFE spheres in both medical CT and microCT reconstructions. The table includes six second moment tensor components of $\langle x^2 \rangle$, $\langle y^2 \rangle$, $\langle z^2 \rangle$, $\langle yz \rangle$, $\langle zx \rangle$ and $\langle xy \rangle$. It should be noted that the components zy, xz and yx are not included in the table because they are redundant: their values would be identical to values for $\langle yz \rangle$, $\langle zx \rangle$ and $\langle xy \rangle$.

The second moment tensor values may be sensitive to the threshold chosen. Accordingly, a threshold value for each of medical CT and microCT may be chosen so that the spheres and the supporting structure are visibly distinct in the reconstruction. In the medical CT example, a threshold value of 1500 was chosen from a scale of 0 to 4095. In the microCT example, a threshold value of 165 was chosen on an inverted scale of 255 to 0.

TABLE 3

|  | $\langle x^2 \rangle$ | $\langle y^2 \rangle$ | $\langle z^2 \rangle$ | $\langle yz \rangle$ | $\langle zx \rangle$ | $\langle xy \rangle$ |
|---|---|---|---|---|---|---|
| Ideal | 2.016 | 2.016 | 2.016 | 0.000 | 0.000 | 0.000 |
| Medical CT A | 1.546 | 1.592 | 1.464 | 0.034 | −0.042 | 0.002 |
| Medical CT B | 1.608 | 1.535 | 1.502 | 0.025 | −0.040 | −0.028 |
| Medical CT C | 1.516 | 1.541 | 1.505 | 0.031 | 0.014 | 0.028 |
| MicroCT A | 1.918 | 1.930 | 1.928 | −0.013 | 0.017 | −0.012 |
| MicroCT B | 1.788 | 1.788 | 1.981 | 0.006 | 0.013 | 0.007 |
| MicroCT C | 1.791 | 1.795 | 1.970 | −0.004 | 0.008 | 0.004 |

The ideal value of 2.016 mm² for the first three columns was found using the formula $R^2/5$ with R=3.175 mm. This radius measure is equivalent to one-half the 6.35 mm sphere diameter shown in manufacturer's specifications.

Voxel values were converted to millimeters using the nominal values of the CT scanner settings. In the case of the medical CT, this setting was 0.703 mm×0.703 mm×1.250 mm. In the case of microCT, this setting was 0.028 mm for each dimension.

As illustrated in Table 3, the microCT volumes shown in the lower three rows are closer to the ideal values than the medical CT values which are shown in the upper three rows. However, referring now to FIG. 7, by adjusting the threshold, many values, including the ideal value may be obtained within medical CT. Moreover, as would be expected, the off-diagonal components of the tensor are negligible.

It is possible that a prolate spheroid may appear during microCT reconstruction. Even if such a prolate spheroid were observed, the $\langle z^2 \rangle$ values are fairly accurate for all three spheres in the case of microCT.

It is also possible that an oblate spheroid may appear during medical CT reconstruction. Despite this possibility, the distances identified as the difference between the centroids of the spheres are both more precise due to the insensitivity to the threshold used during reconstruction. Moreover, the measurements are closer to the ideal value than distances based on an attempt to understand the spatial extent of the sphere in the reconstruction.

The determinant D of the second-moment tensor may be used to obtain a measure of the radius R. Use of this determinant may be more accurate than other methods of calculating radius since it takes into account most of the available data. However, it should be understood that other methods for calculating radius may be used, e.g., edge detection algorithms and the like.

The determinant D of the second moment tensor may be expressed according to the following equation:

$$D = R^6/125 \qquad \text{(Equation 6)}$$

Thus the radii may be expressed according to the following equation:

$$R = (125D)^{1/6} \qquad \text{(Equation 7)}$$

Figure 6:
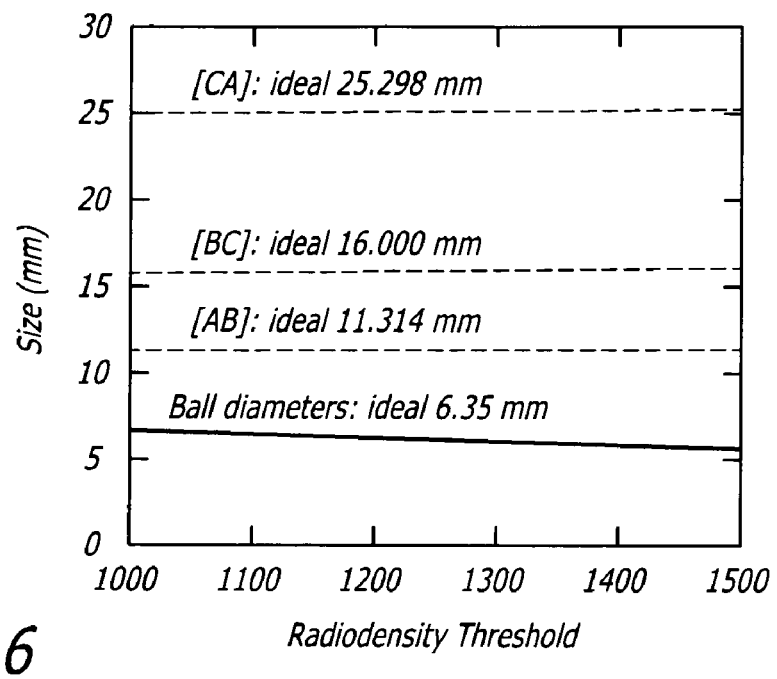
FIG. 6 is a graphical illustration of the distances between coordinates and sphere diameters as a function of threshold in accordance with one embodiment of the present disclosure.
Figure 7:
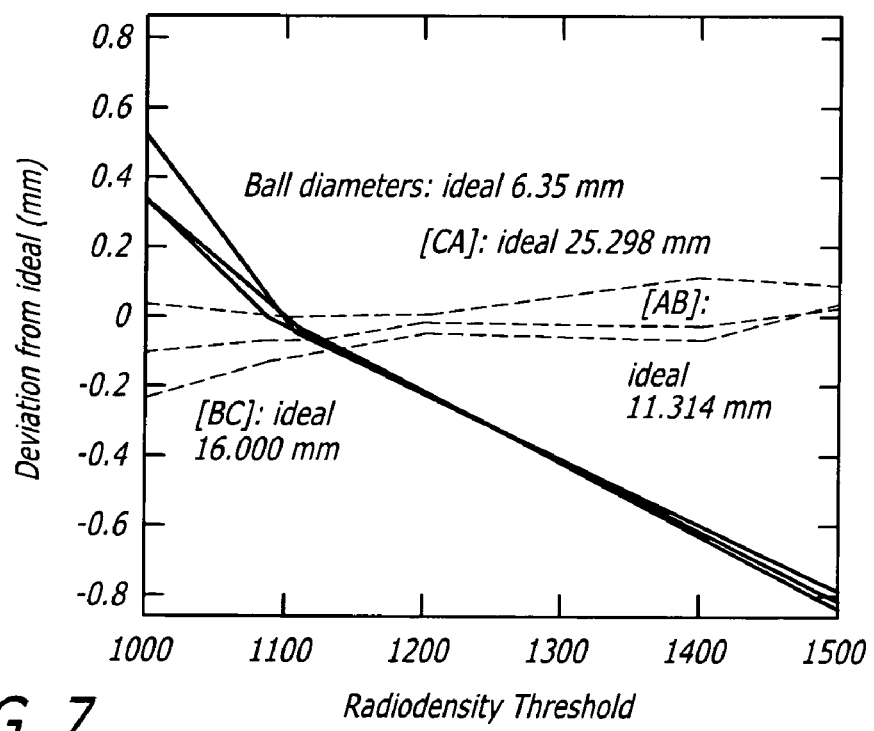
FIG. 7 is a graphical illustration of the deviations of the values plotted in FIG. 6 from their ideal values in accordance with one embodiment of the present disclosure.

Referring now to FIGS. 6 and 7, the diameters reported in these figures were obtained by finding the second moment tensor. Next the determinant D was found. Finally, Equation 6 was applied to determine the radii and thus, the diameter, which is twice the radius.

In lieu of performing a manual calculation for the second moment tensor/diameter calculation, a diameter determination element may be provided in the form of software. This software may reside on any conventional personal computer, and may be provided, for example, as an IBM®-compatible computer, APPLE®, MACINTOSH® personal computer, UNIX®-based workstation, or any other equivalent computer system, whether laptop, desktop or otherwise. Under some circumstances, these workstations may be personal digital assistants (PDA's) or any other such device. The computer system used may also include e.g., a WINDOWS® hand-held device such as a POCKET PC® hand-held device.

Figure 8:
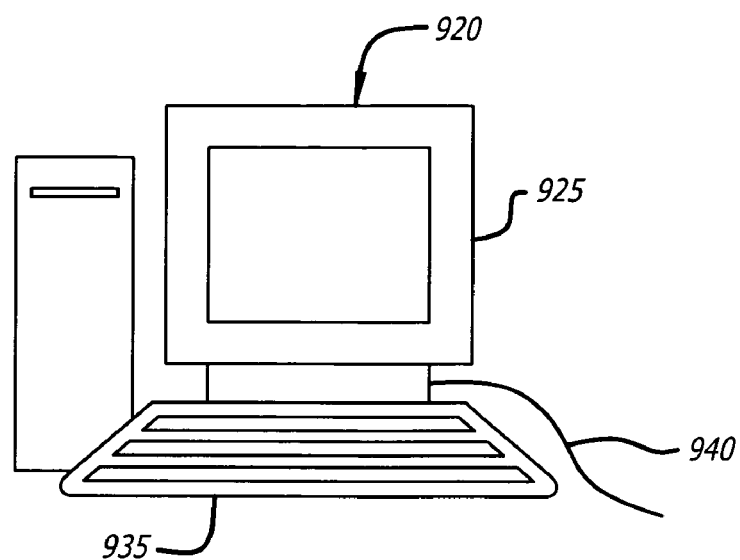
FIG. 8 is a representative workstation for use with software that calculates sphere diameters in accordance with one embodiment of the present disclosure.

As shown in FIG. 8, each workstation 920 may include a central processing unit, a display 925, a mouse 940, and a keyboard 935 for receiving user input into the system. Input devices, e.g., a mouse and the keyboard may be coupled to the workstation so that the computer may receive information that is input by the user, and/or so that imaging information can be routed through a network to a central server.

The exemplary workstations described herein are for descriptive purposes only. Although the description may refer to terms commonly used in describing particular computer systems, the description and concepts equally apply to other processing systems, including systems having architectures dissimilar to those described.

The read only memory (ROM) for each workstation may operate to effect permanent storage of information. Random access memory (RAM) for each workstation may operate to effect temporary storage of information. Each of the aforementioned components may be coupled to a bus. Operation of workstations used to implement the diameter calculation element may be generally controlled and coordinated by operating system software. The operating system that runs on each workstation may be, but is not limited to, MICROSOFT® WINDOWS VISTA®, MICROSOFT® WINDOWS XP®, or a version of MAC OS® or UNIX® operating system or the like.

Alternatively, the principles of the present invention can be applied to a computer system using a version of DOS (disk operating system), or other operating system programs. An operating system resident in system memory and executed by the CPUs of the workstations may coordinate the operation of the other elements of workstations.

Data and software, including the diameter calculation software, may be provided to and extracted from each workstation or a central server via removable storage media such as, without limitation, a CD-ROM or DVD.

Each workstation may include a communications adapter which allows the workstation to be interconnected to a local area network (LAN), a wide area network (WAN) or a public network. Thus, diameter calculation data and related computer program software may be transferred to and from each workstation via the adapter and network.

Referring back to FIGS. 6 and 7, the dimensional reference apparatus provides sufficient precision for both medical CT and microCT reconstructions. As shown in FIGS. 6 and 7, the centroid-to-centroid measurements may be fairly precise despite a change in the threshold used. Because the material used in the apparatus, e.g., PTFE, is compatible with the range of X-ray absorption found in the human body, a significant number of standard reconstruction algorithms are capable of giving satisfactory reconstructions. Moreover, BK7 glass is also capable of giving a satisfactory reconstruction.

Although previous embodiments of the dimensional reference apparatus have been discussed in connection with X-ray computerized tomography, the apparatus may also be used in connection with MRI tomography.

Embodiments of the dimensional reference apparatus that are directed to MRI tomography may be composed in either a "positive space" or "negative space" implementation. In either case, a plurality of spheres may be spaced apart at known distances and the centroids of the spheres may be found in the resultant reconstructed images.

However, a challenge is presented with the MRI implementation of the dimensional reference that is not present in the X-ray CT implementation hereinabove. More particularly, plastic and glass spheres, as well as a significant number of solid structural materials, may not be detectable by a medical MRI. Conversely, water and gels are commonly used in medical MRIs to provide for contrast.

Nonetheless, a coating may be used to make the solid spheres of the apparatus of FIGS. 1A-1C detectable to the MRI. For example, a method for coating polyethelene has been has been developed by X. Jiang et al. to provide for such contrast. (X. Jiang et al., "Surface Functionalization of Polyethylene for Magnetic Resonance-Signal Enhancing Coating Materials", Chem. Mater. 14, 1914-1920 (2002).) Accordingly, the same dimensional reference apparatus having a coating element could be detectable both in MRI and X-ray CT.

Figure 9:
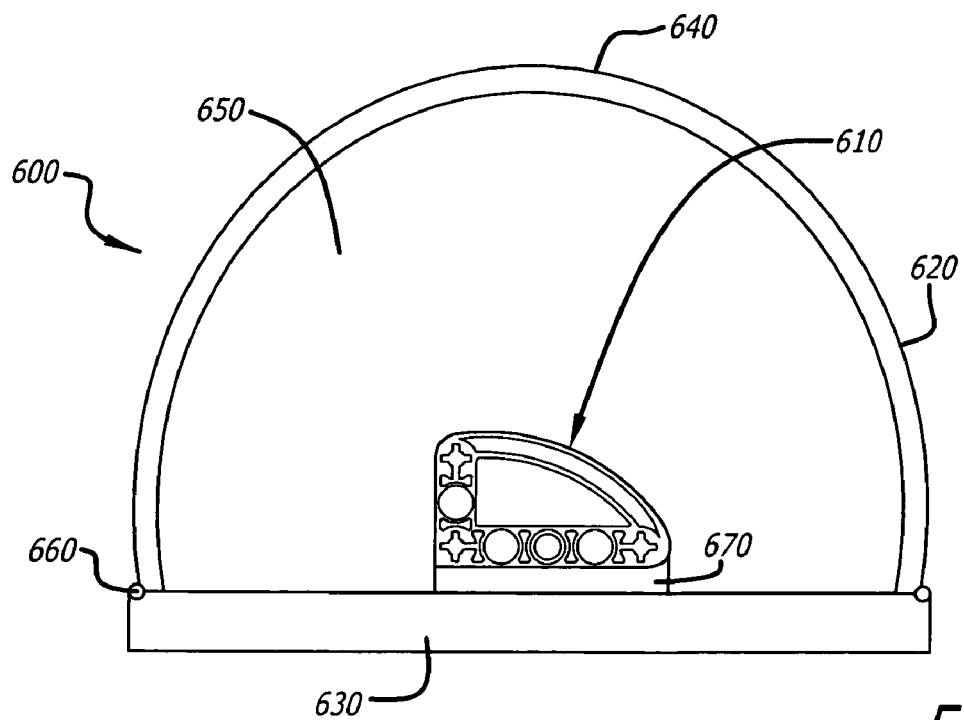
FIG. 9 illustrates a "negative space" dimensional reference apparatus for magnetic resonance imaging (MRI) tomography in accordance with one embodiment of the present disclosure.

A "negative space" MRI embodiment could also be implemented. Referring now to FIG. 9, illustrated is an MRI implementation of the dimensional reference apparatus in accordance with one embodiment of the present disclosure.

As shown, the dimensional reference system 600 may include a dimensional reference apparatus 610. The dimensional reference apparatus could be identical to that shown in FIG. 1. The apparatus 610 may be disposed within a housing or enclosure 620. The enclosure 620 may include a base 630 and a dome-shaped upper portion 640 composed of plastic such as Plexiglas. A fluid-tight seal 660 may be used at the junction of the dome-shaped upper portion 640 of the enclosure 620 and the base 630. The seal 660 provides protection from leakage of the mixture 650 contained within the enclosure 620. The apparatus 610 may be affixed to the enclosure 620 using cyanoacrylate glue 670 or any other suitable affixing element.

Also disposed within enclosure 620 may be a mixture 650 that includes water, which is a common material used for contrast in MRI. A contrast-enhancing agent such as gadolinium chelate may be mixed with the water. The mixture may further include ethanol in order to enhance sterility. It should be noted that neither the spheres nor the fixtures of the dimensional reference apparatus may be visible on the MRI. It is possible that only the fluid may be visible on the MRI, unless a coating is used on the solid spheres as described above.

Figure 10A:
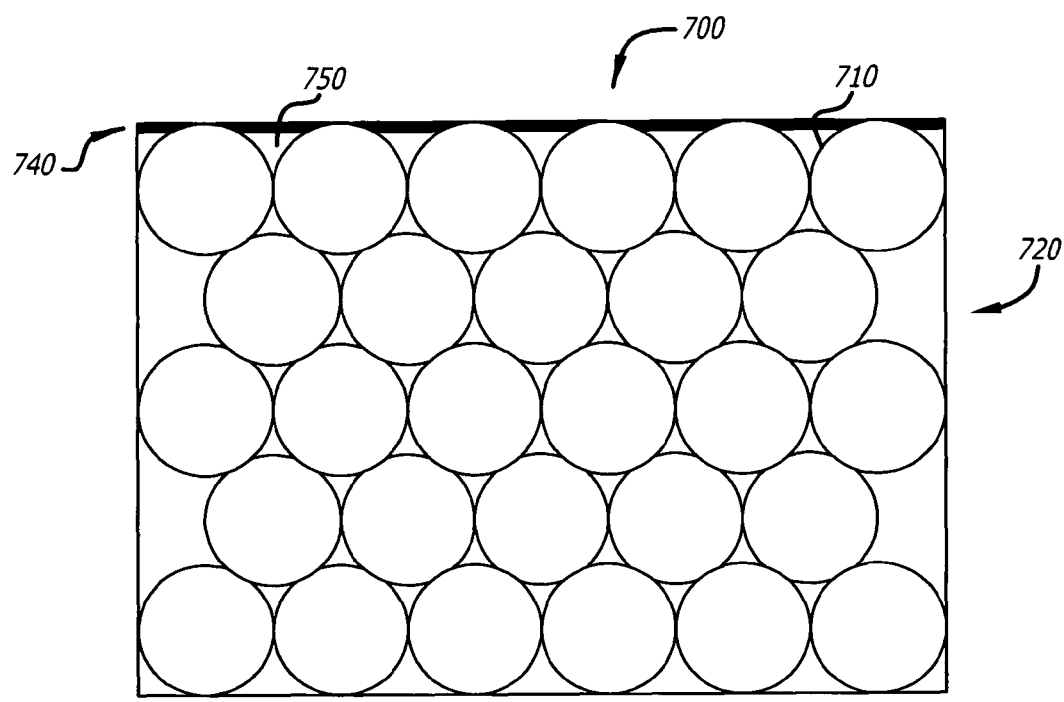
FIGS. 10A and 10B illustrate yet another "negative space" dimensional reference apparatus for magnetic resonance imaging (MRI) tomography in accordance with one embodiment of the present disclosure.

Referring now to FIG. 10A, illustrated is front view of yet another negative space implementation of the dimensional reference system 700 in accordance with one embodiment of the present disclosure. In this embodiment, the enclosure 720 may be a box composed of polycarbonate and glue. Polycarbonate may be used as a structural plastic here because it is quite durable, easily machined and not visible to MRI. In addition, polycarbonate may be transparent throughout most of the visible spectrum. Accordingly, it may provide a user with the advantage of being able to see where each object is within the enclosure 720, when the system is being prepared for use or when the system is in use.

Disposed within the enclosure 720 may be a plurality of spheres 710. The particular number of spheres used may be dependent upon the size of the enclosure 720. In a number of cases, 20-100 spheres may be sufficient. The enclosure 720 may be packed with a hexagonal close-packed array of spheres 710 composed of a nonmagnetic material which is not detectable by MRI. Examples of such materials include acetyl and/or PTFE. Because the spheres are to be used as dimensional references based on distances between the spheres, the spheres 710 should be packed as tightly as possible in order to prevent movement and to ensure the spheres are close to their ideal positions. In order to further ensure that the spheres 710 are fixed in position, a cylinder apparatus containing openings for fixedly positioning the spheres 710 may be included. Each sphere may be disposed within a particular cylinder. Other means of fixedly positioning the spheres may be provided through other support structures.

As with the previously discussed negative space embodiment, a mixture containing fluid may be included in the enclosure 720. A watertight seal 740 may be provided to prevent leakage of the mixture or fluid. The mixture may contain a number of elements designed to make the mixture 750 visible on the MRI.

As noted above, water is commonly used for contrast in MRI. Because the spheres 710 have a solid structure, the spheres 710 may appear as voids or empty space in a reconstructed MRI image. Accordingly, because the mixture 750 may be visible in an MRI reconstruction, there will be contrast between the spheres which appear as voids. To further enhance contrast, an appropriate contrast-enhancing agent such as the chelate diethylenetraminepentacetic acid (DTPA) with $Gd^{3+}$ may be added.

Sterility may also be a concern in medical applications. Accordingly, to enhance sterility, an admixture of 15% ethanol may also be added.

Figure 10B:
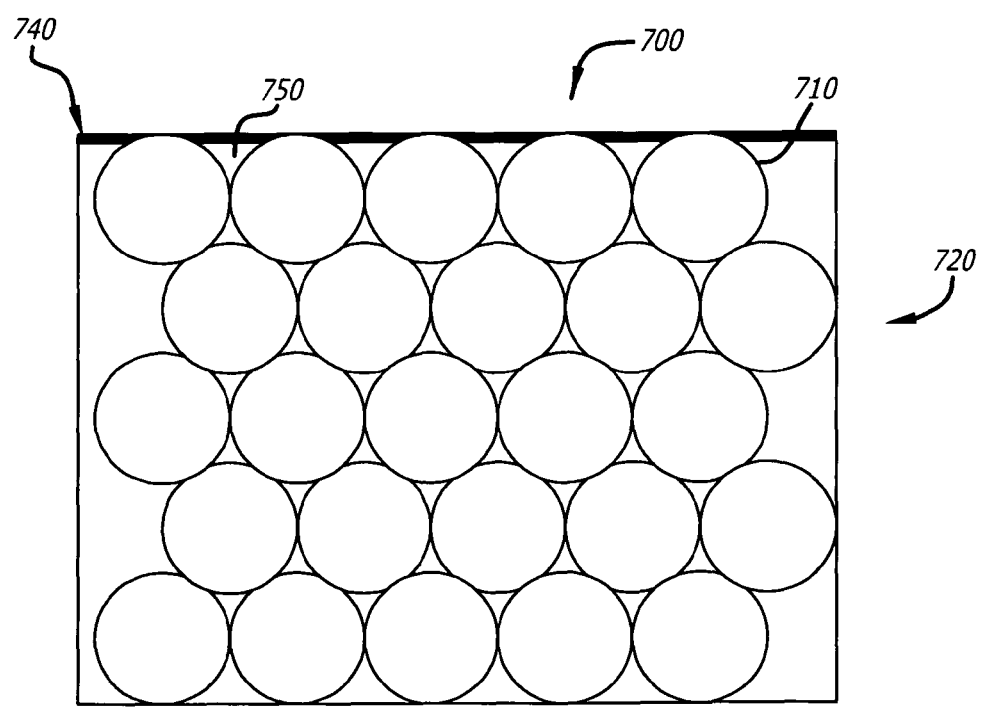

Referring now to FIG. 10B, illustrated is a side view of the negative space close-packed array implementation of the dimensional reference apparatus. Because of the symmetry of the close-packed array, the side view of FIG. 10B appears very similar to the front view of FIG. 10A.

In the resultant reconstructed MRI image, the lattice parameters of the voids in the reconstructed MRI image may be found. Accordingly, the centroids of the spheres 710 may also be found.

The spheres are held snugly within the enclosure 710, so any partitioning scheme of the spheres and adjacent structures would be symmetrical. Therefore, any such partitioning scheme would have little effect on the determination of the balls' centroids.

While the specification describes particular embodiments of the present invention, those of ordinary skill can devise variations of the present invention without departing from the inventive concept.

We claim:

1. A dimensional reference system for image reconstruction in tomography, comprising:
    a dimensional reference apparatus having:
        a plurality of spheres, each sphere having an X-ray absorption property configured to permit reconstruction of the sphere in tomography, each sphere further having a centroid and a diameter;
        a spacer unit configured to substantially fixedly space apart each of said plurality of spheres from each other at a known distance;
    wherein, when reconstructed in tomography, the dimensional reference apparatus is configured to provide sub-voxel length scales for three dimensions, wherein said length scales are provided based on either the known distances between the centroids of the plurality of spheres, or the diameters of the spheres; and
    a diameter calculation element configured to calculate the diameter of at least one of the plurality of spheres, wherein the diameter calculation element includes a second moment tensor element configured to determine the second moment tensor of the at least one of the plurality of spheres.

2. The dimensional reference system of claim 1 wherein the X-ray absorption properties of the spheres are different from an X-ray absorption property of the spacer unit.

3. The dimensional reference system of claim 2 wherein:
    the spheres are composed of a sphere material having an X-ray absorption property between approximately +500 Hounsfield units and +1200 Hounsfield units, and wherein,
    the spacer unit is composed of a spacer unit material having an X-ray absorption between approximately −100 Hounsfield units and +400 Hounsfield units.

4. The dimensional reference system of claim 1, wherein:
    the sphere material is PTFE, or BK7 optical glass.

5. The dimensional reference system of claim 1, wherein at least one sphere has a coating material that permits reconstruction of the at least one sphere in MRI tomography.

6. The dimensional reference system of claim 1, wherein the known distance between the centroids of any two of the plurality of spheres is greater than the size of either of said two of said plurality of spheres.

7. The dimensional reference system of claim 1, wherein the plurality of spheres are substantially identical to each other.

8. The dimensional reference of claim 1, wherein the spacer unit includes:
    at least two fixtures configured to substantially fixedly sandwich the plurality of spheres therebetween;
    at least one securing element configured to secure the at least two fixtures to each other.

9. A dimensional reference system for image reconstruction in X-ray computerized tomography, comprising:
    a dimensional reference apparatus having:
        three substantially identical spheres, each sphere being composed of a sphere material having an X-ray absorption property between approximately +500 Hounsfield units and +1200 Hounsfield units, each sphere further having a centroid and a diameter;
        a spacer unit configured to substantially fixedly space apart each of said plurality of spheres from each other at a known distance, the spacer unit being composed of a spacer unit material having an X-ray absorption between approximately −100 Hounsfield units and +400 Hounsfield units, wherein the spacer unit comprises two fixtures, each fixture having three circular holes into which the three substantially identical spheres are configured to be disposed;
    wherein, when reconstructed in tomography, the dimensional reference apparatus is configured to provide sub-voxel length scales for three dimensions, wherein said length scales are provided based on either the known distances between the centroids of the plurality of spheres, or the diameter of at least one of the plurality of spheres; and
    a diameter calculation element configured to calculate the diameter of at least one of the plurality of spheres, wherein the diameter calculation element includes a second moment tensor element configured to determine the second moment tensor of the at least one of the plurality of spheres.

10. The system of claim 9, further comprising an image reconstruction apparatus configured to provide a reconstructed tomogram of the dimensional reference apparatus and a measurement subject.

11. The dimensional reference system of claim 9, wherein: the sphere material is PTFE.

12. A negative space dimensional reference system for use in MRI tomography, comprising:
    a fluid-tight enclosure;
    a dimensional reference apparatus having:

a plurality of substantially identical spheres, each sphere having an X-ray absorption property configured to permit reconstruction of the sphere in tomography, each sphere further having a centroid and a diameter;

a spacer unit configured to substantially fixedly space apart each of said plurality of spheres from each other at a known distance;

wherein, when reconstructed in tomography, the dimensional reference apparatus is configured to provide subvoxel length scales for three dimensions, wherein said length scales are provided based on either the known distances between the centroids of the plurality of spheres, or the diameter of at least one of the plurality of spheres;

a mixture configured to provide contrast between the mixture and the dimensional reference apparatus; and wherein, the mixture and dimensional reference apparatus are configured to substantially fill the interior of the enclosure; and a diameter calculation element configured to calculate the diameter of at least one of the plurality of spheres, wherein the diameter calculation element includes a second moment tensor element configured to determine the second moment tensor of the at least one of the plurality of spheres.

13. The negative space dimensional reference system of claim 12, wherein the mixture contains water.

14. The negative space dimensional reference system of claim 13, wherein the mixture contains a contrast-enhancing agent.

15. The negative space dimensional reference system of claim 14, wherein the contrast-enhancing agent includes gadolinium chelate DTPA.

16. The negative space dimensional reference system of claim 15, wherein the mixture contains a sterile agent configured to enhance sterility.

17. The negative space dimensional reference system of claim 16, wherein the sterile agent includes ethanol.

18. A negative space dimensional reference array system for use in MRI tomography, comprising:

a fluid-tight enclosure;

a plurality of substantially identical spheres, each sphere being arranged in substantially a hexagonal close packed array, each sphere further having a centroid and a diameter, and wherein, when reconstructed in tomography, the plurality of spheres are configured to provide subvoxel length scales for three dimensions, wherein said length scales are provided based on either the known distances between the centroids of the plurality of spheres, or the diameter of at least one of the plurality of spheres;

a mixture configured to provide contrast between the mixture and the plurality of spheres; and wherein, the mixture and the plurality of spheres are configured to substantially fill the interior of the enclosure.

19. The negative space dimensional reference system of claim 18, wherein the spheres are composed of acetyl or PTFE.

20. The negative space dimensional reference system of claim 18, further comprising:

a diameter calculation element configured to calculate the diameter of at least one of the plurality of spheres, wherein the diameter calculation element includes a second moment tensor element configured to determine the second moment tensor of the at least one of the plurality of spheres.

* * * * *